United States Patent [19]
Park et al.

[11] Patent Number: 5,599,850
[45] Date of Patent: Feb. 4, 1997

[54] PRE-EXPANDED ARTICLES OF A POLYOLEFIN RESIN HAVING MICROCELL AND PROCESS FOR PREPARING THEREOF

[75] Inventors: Young H. Park; Jeong D. Suh; Young D. Lee, all of Taejon, Rep. of Korea; Tae H. Kwack, Gread Neck, N.Y.; Won J. Choi, Taejon, Rep. of Korea

[73] Assignee: Hanwha Chemical Corporation, Seoul, Rep. of Korea

[21] Appl. No.: 510,844

[22] Filed: Aug. 3, 1995

[30] Foreign Application Priority Data

Aug. 6, 1994 [KR] Rep. of Korea ................ 1994-19437

[51] Int. Cl.$^6$ ......................................... C08J 9/18
[52] U.S. Cl. ................................ 521/60; 521/58
[58] Field of Search ........................ 521/58, 56, 60

[56] References Cited

U.S. PATENT DOCUMENTS

| | | | |
|---|---|---|---|
| 4,448,901 | 5/1984 | Senda et al. | 521/58 |
| 4,540,718 | 9/1985 | Senda et al. | 521/58 |
| 4,704,239 | 11/1987 | Yoshimura et al. | 521/58 |
| 4,810,440 | 3/1989 | Yoshida et al. | 521/56 |
| 4,861,531 | 8/1989 | Maeda | 521/60 |
| 4,931,477 | 6/1990 | Shiiki et al. | 521/58 |
| 5,017,621 | 5/1991 | Shiiki et al. | 521/58 |
| 5,459,169 | 10/1995 | Tokoro et al. | 521/59 |

FOREIGN PATENT DOCUMENTS

| | | |
|---|---|---|
| 60-49040 | 3/1985 | Japan . |
| 63-107516 | 5/1988 | Japan . |

*Primary Examiner*—Morton Foelak
*Attorney, Agent, or Firm*—Birch, Stewart, Kolasch & Birch, LLP

[57] ABSTRACT

The present invention relates to a process for preparing pre-expanded articles of a polyolefin resin wherein a blowing agent is incorporated into the polyolefin resin in an amount of 45 to 90 parts by volume with respect to 100 parts by volume of the resin and the pre-expansion is carried out at a temperature in the range of from Tm −35° C. to Tm −20° C., or a second external pressured gas which facilitate the impregnation efficiency of the blowing agent is further introduced in an amount of expressing an additional pressure more than 10 kg/cm$^2$ with the blowing agent. Also, the present invention relates to pre-expanded articles of a polyolefin resin produced by the above process.

12 Claims, 5 Drawing Sheets

PRE-EXPANDED ARTICLES OF A POLYOLEFIN RESIN HAVING MICROCELL AND PROCESS FOR PREPARING THEREOF

BACKGROUND OF INVENTION

1. Field of Invention

The present invention relates to a process for preparing pre-expanded articles of a polyolefin resin having a microcell structure and the pre-expanded articles prepared by the process.

More specifically, the present invention relates to a process for preparing pre-expanded articles in which a hydrocarbon blowing agent such as butane or an inorganic blowing agent is used as a substitute for the freon which has been used until recently as a conventional blowing agent, and furthermore, an impregnating condition of the blowing agent is maintained constantly during the pre-expansion at a certain low temperature range, thereby the pre-expansion being carried out without any anti-adhesion chemical agents or dispersing surfactants.

The present invention also relates to the pre-expanded articles prepared by the process as above mentioned. The pre-expanded articles thus obtained has microcell structure and shows excellent properties in compressive strength and relaxation capability, etc.

2. Background Art

Hitherto, numerous studies relating to the pre-expanded articles of a polyolefin resin and their preparation methods have been carried out in the art. For example, Japanese Patent Publication No. 49040/1985 describes that pre-expansion can be carried out at a temperature in the range of from Tm −25° C. to Tm −5° C. (hereinafter "Tm" means a temperature at which melting of the used resin is terminated) and preparing pre-expanded articles below the temperature of that range is impossible for molding afterwards. And the Publication also describes that the moldability is related to the presence and appearance of the higher melting peak as determined by the differential scanning calorimeter (hereinafter referred to as DSC). This suggests that two melting peaks on DSC curve is important for moldability.

In addition, Japanese Patent Publication No. 107516/1988 describes that the pre-expanded articles can be prepared at a temperature in the range of from Tm +1° C. to Tm +7° C. of the resin used and that when a heat of fusion $Q_H$ for the higher melting peak corresponds to 0.5 to 2.3 cal/g, it is possible to prepare expanded articles without any additional internal pre-pressurization during molding. These pre-expanded articles having not only two distinct melting peaks as determined by DSC but also specific ranges of $Q_H$ for the higher melting peak were claimed to exhibit particular efficiencies in molding.

The aforementioned two publications may be recognized as covering the most broad and basic contents regarding the preparation of pre-expanded polyolefin resin articles. And numerous improvements including them have been made in this art. Most of these inventions, however, use freon gas of halogenated hydrocarbon as a blowing agent, which is well known to a person skilled in the art as the most effective blowing agent for preparing pre-expanded polyolefin resin.

In spite of their effectiveness, the use of the freon based blowing agents is forbidden due to the harmful influence against environment. Therefore, substitute blowing agents such as hydrocarbons or inorganic materials should be used.

The substitute blowing agents, however, have been recognized as having problems such as a lowering of expansion force of the pre-expanded articles (that is, a falling off in expansion ratio) or a lowering of cooling capacity for cell stabilization in contrast to the prior ones. Actually, it has been reported that the cell size of the pre-expanded articles and the cell distribution are substantially irregular when substitute blowing agents instead of freon based blowing agents are used, and the irregularities cause a deterioration in some physical properties.

SUMMARY OF THE INVENTION

Thus, it is required to develop a process for preparation of pre-expanded articles which have similar or superior physical properties in compressive strength and relaxation capability, etc. and also have higher expansion ratio in comparison with the prior pre-expanded articles prepared by using the freon based blowing agents. Accordingly, the present inventors have focussed their attention on this point and studied for a long time, and consequently found that the impregnated amount of the blowing agent can be increased and uniformed through the resin by incorporating an excessive amount (parts by volume) of the blowing agent with respect to the resin used or further introducing a second external pressured gas which facilitates the impregnation efficiency of the blowing agent into the resin simultaneously with incorporation of the blowing agent. Taking advantage of the above means, the inventors have completed the present invention which provides a process for preparing the desired pre-expanded articles in which pre-expansion is carried out at a low temperature in order to produce pre-expanded articles having microcells, and several effects such as cost reduction or promoting productivity have been accomplished.

Therefore, it is an object of the present invention to provide a process for preparing pre-expanded articles of a polyolefin resin characterized in that a blowing agent is incorporated into the polyolefin resin in an amount of 45 to 90 parts by volume with respect to 100 parts by volume of the resin and the pre-expansion is carried out at a temperature in the range of from Tm −35° C. to Tm −20° C.

Furthermore, according to the process of the present invention, an inorganic compound based anti-adhesion agent need not be used. Hitherto, the anti-adhesion chemical agent has been used for the prevention of adhesions between the resin particles contained in a reactor during the impregnation of a blowing agent. And to remove the anti-adhesion chemical agent before molding, large amount of water, neutralizing agent and an equipment for treating the discharged waste water should be used. In view of these problems and recent tendencies to minimize the environmental pollution or to simplify manufacturing steps, it is preferable not to use any anti-adhesion chemical agents. Therefore, it is recognized that the present invention suggests a solution against such problems.

It is another object of the present invention to provide pre-expanded articles of a polyolefin resin produced by the process described above. In the present invention, particularly, the pre-expanded articles can be produced with a minimum usage of water and other chemical agents.

The foregoing has outlined some of the more pertinent objects of the present invention. These objects should be construed strued to be merely illustrative of some of the more pertinent features and applications of the invention. Many other beneficial results can be obtained by applying the disclosed invention in a different manner or modifying the invention within the scope of the disclosure. Accordingly, other objects and a more thorough understanding of the invention may be had by referring to the disclosure of invention, in addition to the scope of the invention defined by the claims.

BRIEF DESCRIPTION OF THE DRAWINGS

For a thorough understanding of the nature and objects of the invention, reference should be made to the following detailed description taken in connection with the accompanying drawings in which.

DETAILED DESCRIPTION OF THE INVENTION

In one aspect, the present invention relates to a process for preparing pre-expanded articles of a polyolefin resin. This process can reduce the manufacturing costs and does not induce any environmental pollutions caused by chemicals such as anti-adhesion agents and dispersing surfactants. In addition, this process can produce pre-expanded articles having a good moldability without using anti-adhesion chemical agents or dispersing surfactants which have been recognized as indispensable one in the previously used processes.

The process according to the present invention comprises adding a resin to be expanded and water serving as a carrier into a pressure vessel in an amount of occupying 70% of the vessel, incorporating a blowing agent in an amount of 45 to 90 parts by volume, preferably 50 to 70 parts by volume with respect to 100 parts by volume of the used resin and pre-expanding the resin at a temperature in the range of from Tm −35° C. to Tm −20° C. The process can further comprise introducing a second external pressured gas which facilitates the impregnation efficiency of the blowing agent to the vessel in an amount of expressing an additional pressure more than 10 kg/cm$^2$ upon incorporation of the blowing agent.

As the polyolefin resin used in the present invention, propylene homopolymer, ethylene-propylene random copolymer, ethylene-butadiene copolymer, ethylene-propylene-butene copolymer, propylene-butene copolymer, polyethylene and other conventional polymers, and a mixture thereof can be mentioned. These polymers can be used in a particle form of sphere, cylinder, square or rectangle and possibly the sphere like form is most preferable among them. For preparing the pre-expanded articles, strand cutting or under-water cutting method can be applied and it is preferable to use particles having a size of 0.5 to 1.5 mm.

The blowing agent incorporated into the resin can be selected from a group consisting of an aliphatic hydrocarbon such as propane, butane, isobutane, pentane, hexane, etc., and an inorganic blowing agent. Among them, butane or isobutane can be used preferably, and in case of butane, more than 80% of the incorporated one can be cooled and reused after preparing the pre-expanded articles. When the existing freon is used as a blowing agent, serious problem of rising the manufacturing costs can be occurred. In contrast to this, when the hydrocarbon blowing agent such as butane is used, such a problem can be solved due to the high ratio of recovery.

The second external pressured gas is introduced to facilitate the impregnation of the blowing agent into the resin and improve the uniformity of impregnation by increasing the pre-expansion pressure; the gas which may be used includes one or more selected from a group consisting of methane, nitrogen, oxygen, carbon dioxide and air; and among them, a gas having a critical temperature below 35° C. can be preferably used. By introducing the second external pressured gas with a blowing agent, an excellent product in which the expansion ratio is increased and the cell uniformity of the pre-expanded articles is more improved, can be obtained. Therefore, although the desired pre-expanded articles according to the present invention can be prepared by incorporating the blowing agent alone in large quantities, the present invention can also be effectively carried out by introducing the second external pressured gas simultaneously with the incorporation of the blowing agent.

As explained above, the present inventors have identified that according to the process of the present invention, larger quantities of the blowing agent than those in the prior high temperature based pre-expanding method are impregnated into the particles and thus the impregnation uniformity of the blowing agent is improved without any dispersing surfactants. And, these phenomena effect several advantages as mentioned in the following.

First of all, an unexpected effect that the pre-expanding process can be carried out at a lower temperature than that applied in the past, is achieved by droping the overall viscosity of the resin due to the increased amount of the blowing agent impregnated into the resin. In fact, the impregnated blowing agent acts as a plasticizer for the resin so that the softening temperature of the resin could be lowered.

Generally, making a selection of appropriate pre-expansion temperature is a very important element. In most prior processes using a substitute blowing agent for freon, the pre-expansion is practiced at a higher temperature than the softening point of the used resin with a small amount of blowing agent. On the other hand, in the present invention, it is possible to lower the pre-expansion temperature below the softening point of the used resin, that is, to a temperature in the range of from Tm −35° C. to Tm −20° C. by keeping the content of the blowing agent among the resin up highly. This pre-expansion temperature is still lower than that applied in the prior pre-expansion.

As such a low temperature based pre-expansion can be practicable, the following several effects are achieved. The cell of the pre-expanded articles is stabilized due to the improvement in cooling efficiency during the cell formation and the time required for the process is shortened by lowering the pre-expansion temperature in an amount of 15° to 20° C. in comparison with the prior processes. In addition, the anti-adhesion chemical agent causing several problems need not be used in the present invention and thus economical advantages including the unnecessariness of a waste water treatment facility required for washing out the anti-adhesion chemical agent and dispersing surfactant before molding and the reduction of manufacturing costs can be accomplished.

The previously used processes are carried out in the presence of an anti-adhesion chemical agent such as calcium tertiary phosphate, calcium carbonate or basic zinc carbonate, and these anti-adhesion chemical agents should be removed by an additional equipment before the pre-expanded articles are molded. For example, if the calcium tertiary phosphate is used as an anti-adhesion chemical agent, this can be removed by washing the pre-expanded articles with large quantities of acid and water since the anti-adhesion chemical agent can easily be dissolved in a nitric acid solution or a sulfuric acid solution. During this procedure, large amount of waste water is generated, so that a large-scale equipment is required to separate and neutralize it.

Moreover, pre-expanded articles of good quality can be obtained in the present invention without any dispersing surfactants which are conventionally used in the earlier processes for improving the impregnation efficiency and uniformity. In the present process, the incorporation of large quantities of the blowing agent or the introduction of the second external pressured gas therewith plays a role as a dispersing surfactant.

According to the present invention, the pre-expanded articles having microcell in which the cell size is smaller and more uniform than that of the existing product, can be obtained without any nucleating agents due to the improvement in impregnation uniformity and low temperature based pre-expansion. And, the pre-expanded articles having microcell have been improved in their physical properties such as compressive strength, etc. compared with those having large cell.

The cell size of the pre-expanded articles according to the present invention is in the range of 5 to 150 μm, which is smaller in the ratio of one fifth to a half than the cell size of 170 to 250 μm of the pre-expanded articles produced by a prior method using butane as a blowing agent. These results can be identified by FIGS. 1A, 1B, 2A and 2B showing the electron micrograph of 75 magnifications both of the pre-expanded articles produced by the present and earlier processes.

Since the pre-expansion process of the present invention is carried out at a low temperature below the softening point of the used resin, the obtained pre-expanded articles have a higher DSC melting peak having various size and shape.

Figure 1A:
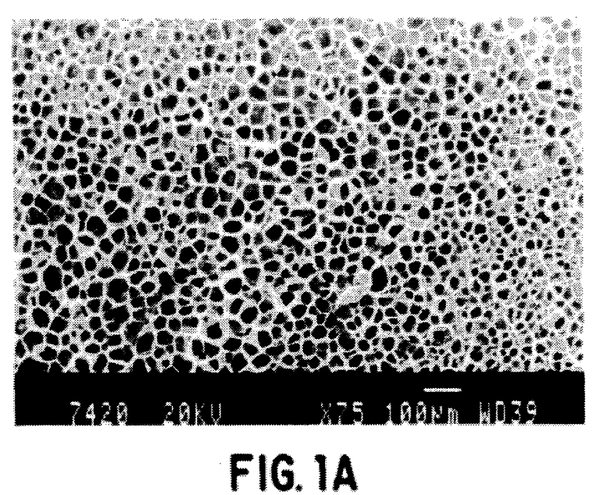
FIGS. 1A and 1B, respectively, represent electron micrograph of the pre-expanded articles obtained from Examples 1 and 4.
Figure 1B:
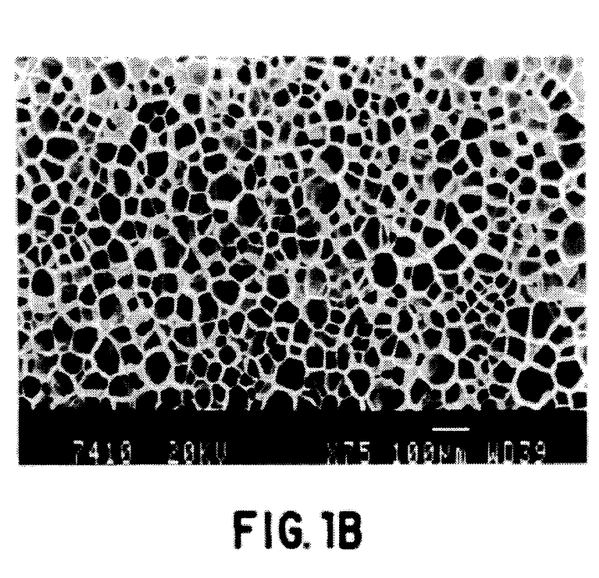
Figure 2A:
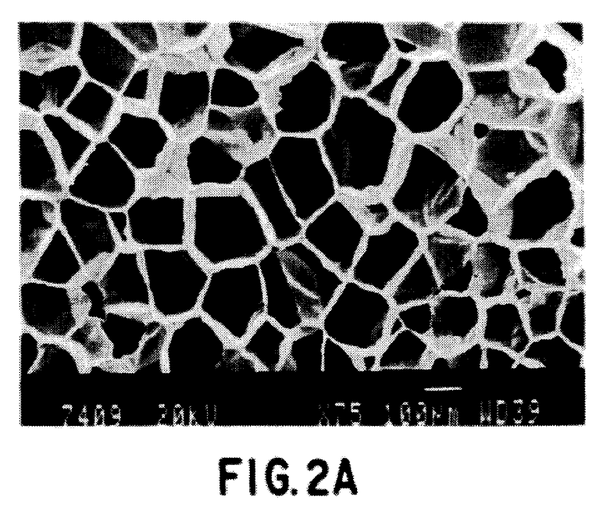
FIGS. 2A and 2B, respectively, represent electron micrographs of the pre-expanded articles obtained from Comparative Examples 1 and 2.
Figure 2B:
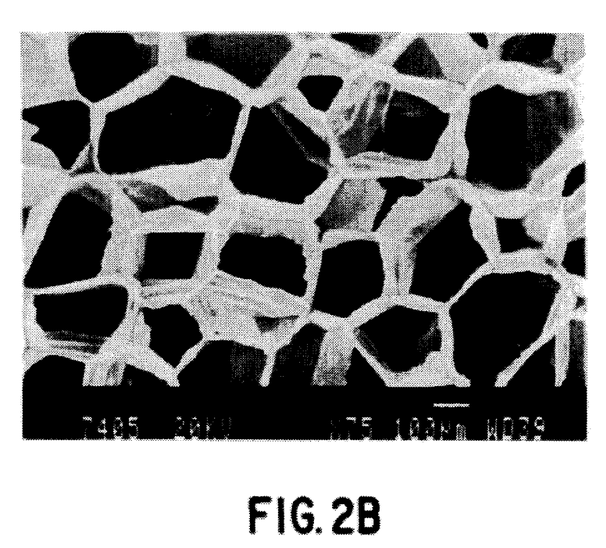
Figure 3:
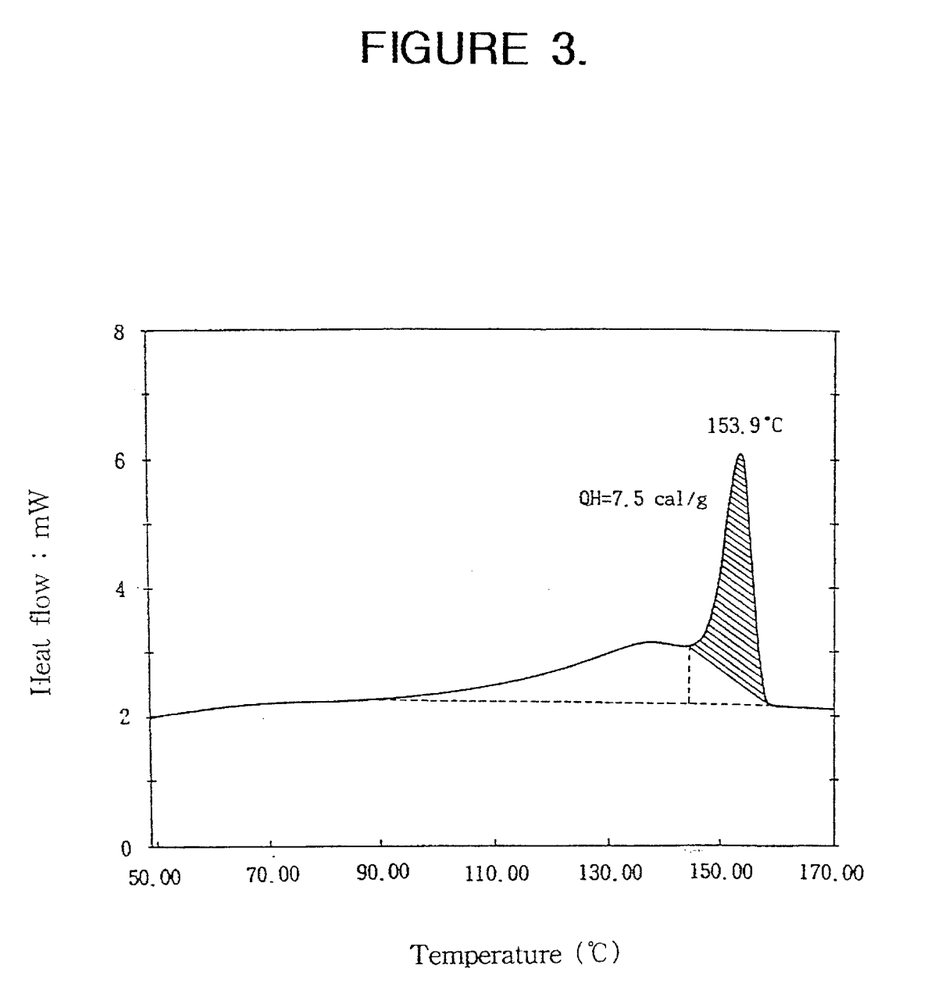
FIG. 3 represents thermogram measured by Differential Scanning Calorimeter for the pre-expanded articles obtained from Example 1.
Figure 4:
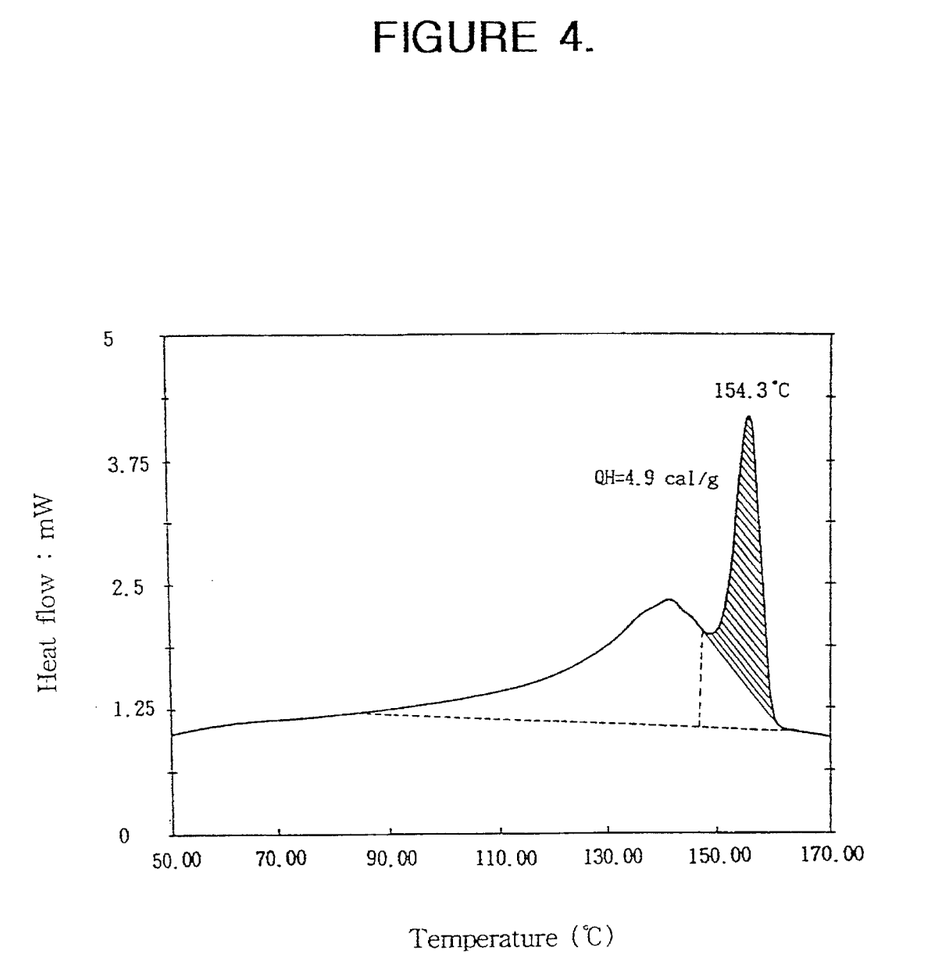
FIG. 4 represents thermogram measured by Differential Scanning Calorimeter for the pre-expanded articles obtained from Example 4.
Figure 5:
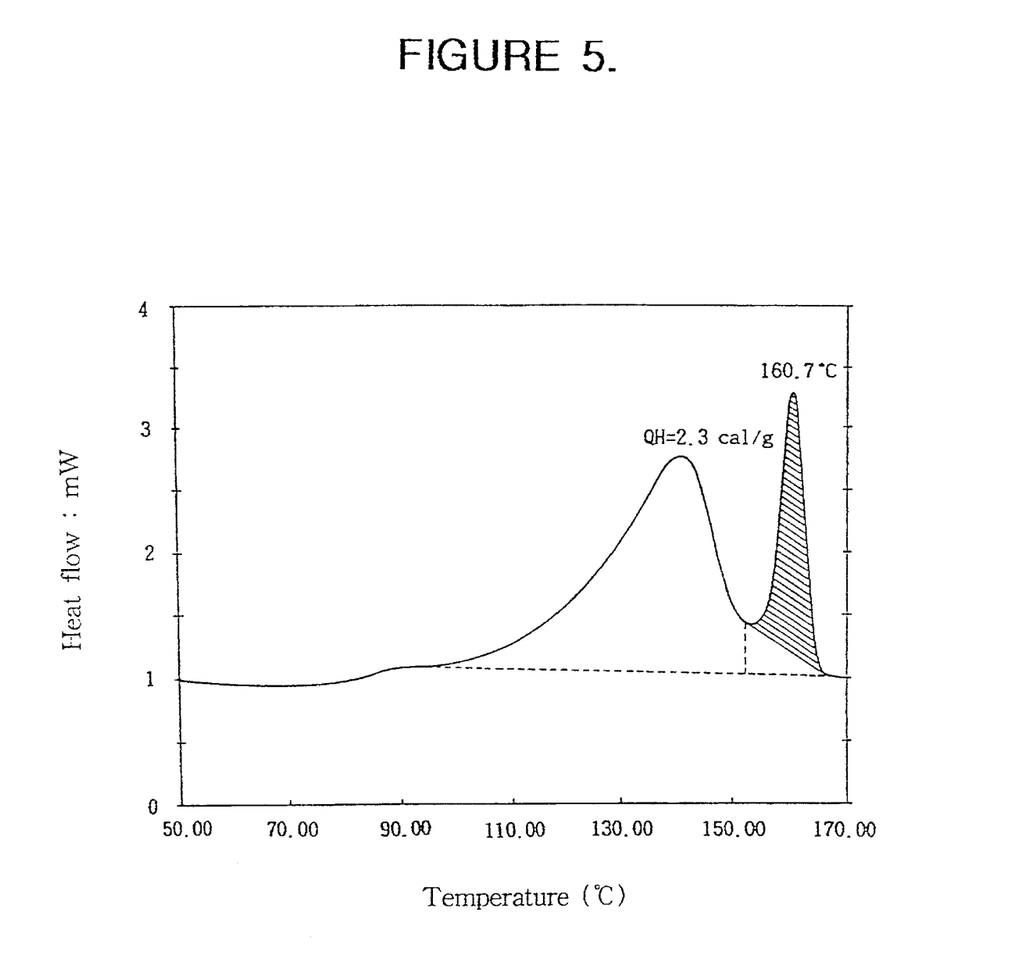
FIG. 5 represents thermogram measured by Differential Scanning Calorimeter for the pre-expanded articles obtained from Comparative Example 1.

In addition, the pre-expanded articles prepared by the present invention show larger heat of fusion for the higher melting peak than those of the pre-expanded articles prepared by the previous practice. For example, as shown in FIG. 3, some samples show unclear peak separation between high and low melting peaks on DSC curve. FIG. 4 also shows similar trends. However, overall size of the higher melting peak of the pre-expanded articles in this invention is larger than that prepared by previous practice, which is shown in FIG. 5 as an example. FIGS. 3, 4, 5 and Table 3 all indicate that values of the heat of fusion of the articles prepared by this invention is larger than those obtained by previous practice.

In the earlier practiced pre-expansion process, it is difficult to raise the heat of fusion $Q_H$ for the higher melting peak in a product of higher expansion ratio. Contrast to this, in accordance with the present invention, there can be provided pre-expanded articles having high heat of fusion.

In the second aspect, therefore, the present invention also relates to pre-expanded articles of a polyolefin resin which have the aforementioned properties.

Generally, the higher molding pressure is known to be required for the pre-expanded articles having higher heat of fusion $Q_H$ for the higher melting. The pre-expanded articles of the present invention having a microcell structure show sufficient stability during the high temperature based molding process. As can be seen from Table 3, when the expansion ratio from a pre-expanded article to a molded article is less than 20, an article having microcell, which shows larger heat of fusion for the higher melting peak (see Examples 1 and 3), exhibits better compressive strength and is more stable in terms of shrinkage after molding than an article in which the heat of fusion is low (see comparative Example 1). This result is caused by the microcell structure and the heat of fusion for the higher melting peak related characteristics. For example, an article produced via the low temperature based pre-expansion process of the present invention wherein the cell size is less than 130 μm and the heat of fusion for the higher melting peak as determined by DSC is larger than 3.4 cal/g, has identified as having 10 to 20% improved compressive strength when compared with an article produced via the earlier used high temperature based pre-expansion process wherein the cell size is more than 170 μm, the heat of fusion for the higher melting peak as determined by DSC is less than 2.3 cal/g. Therefore, it can be concluded that the uniform microcell structure and the crystalline structure newly developed by larger high melting peak have influence upon the improvement of the compressive strength in an article.

Test results relating to the characteristics of the pre-expanded articles and molded articles such as apparent density, expansion ratio, cell size, heat of fusion as determined by DSC, etc. including compressive strength are shown in the following Table 3.

The present invention will be more specifically explained in the following examples. However, it should be understood that the following examples are intended to illustrate the present invention and not to limit the scope of the present invention in any manner.

Examples 1 to 8

A 5 L pressure vessel was charged with 100 parts by volume of ethylene-propylene random copolymer (manufactured by Hyundai Petroleum Co.: R3400, 3.1% of ethylene content, TM=147° C., softening point=132° C.), 250 parts by volume of water as an impregnation carrier and n-butane as a blowing agent. The whole mixture was stirred at a constant rate and then it was heated to the predetermined pre-expansion temperature. After the reaction mixture was maintained for 30 minutes, a 4 mm valve located at the lower part of the pressure vessel was-opened while keeping the temperature and pressure in the vessel as indicated in Table 2 by introducing the blowing agent alone or the blowing agent together with a second external pressured gas to obtain various pre-expanded articles having the characteristics indicated in Table 3.

Afterwards, expanded articles (in-mold expanded articles) can be produced by pressurizing the obtained pre-expanded articles with air in a pressure vessel, filling the pressured particles into a mold (200×200×30 mm) and heat-expanding them with a steam of 3.0 to 6.0 kg/cm³.

With respect to physical properties of the pre-expanded articles and molded articles thus obtained, the expansion ratio of the pre-expanded articles was evaluated based on the apparent density of the used resin (0.6 g/cm³) and that of the expanded articles was evaluated based on the actual density of the used resin (0.9 g/cm³). In addition, the cell size of the pre-expanded articles was calculated from the electron micrograph of 75 magnification. And the heat of fusion ($Q_H$) for the higher melting peak was calculated from the curve obtained by DSC-7 calorimeter (commercially available from the Perkin-Elmer Corp.) wherein the measurement was carried out by heating 3 to 5 mg of said samples at a heating rate of 10° C./min to obtain a graph and subsequently making a tangent line from the starting point of the peak located at the higher temperature to the ending point.

While, the compressive strength of the molded articles was determined at a displacement of 25% by compressing the articles at a displacement rate of 10 mm/min with UTM (Instron 4204). And product evaluation to the molded articles was carried out by calculating the fusion percentage based on a ratio of broken particles to the whole number of particles; the ratio was measured when the articles were cracked by applying vertical force. The test results were evaluated according to the following Table 1.

TABLE 1

| | |
|---|---|
| ⊙ | fusion percentage of 60% or more, shrinkage rate of less than 2%, the product is usable |
| ○ | fusion percentage of 60% or more, shrinkage rate of 2 to 4%, the product is usable |
| Δ | fusion percentage of less than 60%, the product is unusable |
| X | preparation of a pre-expanded particle itself is impossible |

Comparative Examples 1 to 4

A 5 L pressure vessel was charged with 100 parts by volume of ethylene-propylene random copolymer (manufactured by Hyundai Petroleum Ltd.: R3400, 3.1% of ethylene content, TM=147° C., softening point=132° C.), 250 parts by volume of water as an impregnation carrier and n-butane as a blowing agent. Then the pre-expanded articles were prepared above the softening point of the resin used under the-pre-expansion conditions indicated in Table 2. Subsequently, the molded articles were obtained according to the same procedure as Examples in above.

The pre-expanded articles and molded articles thus obtained were evaluated as the same manner described in above Examples and the results are shown in the following Table 3.

TABLE 2

| | Pre-expansion Condition | | | | | | | |
|---|---|---|---|---|---|---|---|---|
| | A | | | | | | | |
| | a' | a" | B | C | D | E | F | G |
| Ex. No. | | | | | | | | |
| 1 | 37 | 55 | 10 | 0 | 0 | 117.5 | 36 | X |
| 2 | 43 | 65 | 10 | 0 | 0 | 117.5 | 37 | X |
| 3 | 33 | 50 | 10 | 0 | 0 | 120 | 35 | X |
| 4 | 40 | 60 | 10 | 0 | 0 | 120 | 37 | X |
| 5 | 37 | 55 | 10 | 0 | 0 | 122.5 | 38 | X |
| 6 | 40 | 60 | 0 | 0 | 0 | 120 | 20 | X |
| 7 | 47 | 70 | 0 | 0 | 0 | 120 | 21 | X |
| 8 | 31 | 50 | 10 | 0 | 0 | 125 | 38 | X |
| Com. Ex. | | | | | | | | |
| 1 | 18 | 27 | 0 | 0.001 | 2 | 138 | 18 | O |
| 2 | 20 | 30 | 0 | 0.001 | 2 | 138 | 20 | O |
| 3 | 20 | 30 | 0 | 0.001 | 2 | 138 | 20 | X |
| 4 | 20 | 30 | 0 | 0 | 0 | 138 | — | — |

Note
A: Blowing agent a' = parts by weight, a" = parts by volume
B: Nitrogen pressure (kg/cm²)
C: Neopelex F-65 (KAO Chemicals) as a dispersing surfactant (parts by weight)
D: Calcium tertiary phosphate as an anti-adhesion agent (parts by weight)
E: Pre-expansion temperature (°C.)
F: Pre-expansion pressure (kg/cm²)
G: Washing step of anti-adhesion agent

TABLE 3

| | Pre-expanded articles | | | | Molded articles | | | |
|---|---|---|---|---|---|---|---|---|
| | H | I | J | K | L | M | N | O |
| Ex. No. | | | | | | | | |
| 1 | 0.045 | 13 | 30 | 7.5 | 4.5 | 15 | ⊙ | 3.52 |
| 2 | 0.023 | 26 | 50 | 5.7 | 4.0 | 30 | ○ | 1.65 |
| 3 | 0.043 | 14 | 50 | 7.3 | 4.5 | 15 | ⊙ | 3.50 |
| 4 | 0.023 | 26 | 80 | 4.9 | 4.0 | 30 | ○ | 1.73 |
| 5 | 0.022 | 27 | 130 | 3.4 | 3.8 | 30 | ○ | 1.70 |
| 6 | 0.046 | 13 | 80 | 7.9 | 4.5 | 15 | ○ | 3.48 |
| 7 | 0.022 | 27 | 100 | 5.9 | 4.0 | 30 | ○ | 1.65 |
| 8 | 0.022 | 27 | 150 | 2.6 | 3.6 | 30 | ○ | 1.60 |
| Com. Ex. | | | | | | | | |
| 1 | 0.044 | 14 | 170 | 2.3 | 4.0 | 15 | ○ | 3.10 |
| 2 | 0.022 | 27 | 250 | 2.1 | 3.5 | 30 | ○ | 1.46 |
| 3 | 0.022 | 27 | 250 | 2.1 | 4.0 | 30 | Δ | — |
| 4 | adhered between the resin particles in the reactor | | | | — | — | X | — |

Note
H: Density of the pre-expanded articles (g/cm³)
I: Pre-expansion ratio
J: Cell size (μm)
K: Heat of fusion for the higher melting peak (cal/g)
L: Molding pressure (kg/cm²)
M: Expansion ratio
N: Product evaluation
O: Compressive strength (kg/cm²)

As shown in the above Tables, according to the present invention, pre-expanded articles with various magnifications can be prepared at a lower temperature range at which the earlier used pre-expansion method should not be practiced. Further, the pre-expanded articles expanded at a lower temperature have not only a higher melting peak having larger heat of fusion as determined by DSC but also uniform microcell structure. Thus, the molded articles obtained from the pre-expanded articles of the present invention have 10 to 20% improved compressive strength with respect to the prior known molded articles of the same magnification.

In addition, since the pre-expansion process was carried out at a low temperature below the softening point, the adhesion phenomena between the resin particles in the reactor is not observed in the present process. Therefore, anti-adhesion chemical agent need not be used in the present process for preparing the pre-expanded articles, and thereby the step of removing the anti-adhesion agent may be omitted and also the time for the process can be shortened.

Consequently, the present invention can provide excellent pre-expanded articles by which various effects such as preparing lighter product, cost reduction and promoting productivity, etc. can be achieved when molded articles are prepared therefrom, and process for preparing the pre-expanded articles.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A process for preparing pre-expanded articles of a polyolefin resin, wherein the pre-expanded articles have a microcell structure, which process comprises:

incorporating a blowing agent into the polyolefin resin in an amount of 45 to 90 parts by volume with respect to 100 parts by volume of the resin, and carrying out a pre-expansion of the polyolefin resin at a temperature that is in the range of from Tm $-35°$ C. to Tm $-20°$ C., but below the softening point of said polyolefin resin;

wherein Tm is defined as the temperature at which melting of the polyolefin resin stops.

2. The process according to claim 1, wherein the blowing agent is selected from the group consisting of an aliphatic hydrocarbon blowing agent and an inorganic blowing agent.

3. The process according to claim 1, wherein a second external pressured gas is further introduced into the resin simultaneously with the incorporation of the blowing agent so that an additional pressure of 10 $kg/cm^2$ is expressed.

4. The process according to claim 3, wherein the second external pressure gas is one or more selected from the group consisting of methane, nitrogen, carbon dioxide and air.

5. The process according to claim 1, wherein the pre-expansion is carried out without any anti-adhesion chemical agents or surfactants.

6. The process according to claim 1, wherein the blowing agent is incorporated into an ethylene-propylene random copolymer in an amount of 50 to 70 parts by volume with respect to 100 parts by volume of the resin and the pre-expansion temperature is in the range of from Tm $-30°$ C. to Tm $-20°$ C.

7. Pre-expanded articles prepared by the process of claim 1.

8. The pre-expanded articles according to claim 7, wherein the articles consist essentially of microcells that are in the range of 5 to 150 μm.

9. The process of claim 1, wherein said articles are particles.

10. Pre-expanded particles prepared according to the process of claim 1.

11. The pre-expanded particles of claim 10, wherein the particles consist essentially of microcells that are in the range of 5 to 150 μm.

12. The process according to claim 2, wherein the aliphatic hydrocarbon blowing agent is selected from the group consisting of propane, n-butane, isobutane, pentane and hexane.

* * * * *